United States Patent [19]

McLane

[11] 4,069,899
[45] Jan. 24, 1978

[54] VACUUM SUSPENDED DISC BRAKE

[76] Inventor: Cletus McLane, 2520 Quitman St., Denver, Colo. 80212

[21] Appl. No.: 713,385

[22] Filed: Aug. 11, 1976

[51] Int. Cl.$^2$ ............... F16D 55/224; B60T 13/60
[52] U.S. Cl. .................................. 188/72.1; 60/560; 60/563; 188/106 P; 188/357; 192/85 V
[58] Field of Search ........... 91/19; 188/72.4, 72.1, 188/356, 357, 106 P; 192/83, 85 V; 60/547, 560, 563

[56] References Cited

U.S. PATENT DOCUMENTS

| | | | |
|---|---|---|---|
| 2,307,619 | 1/1943 | Brewer | 192/85 V X |
| 3,935,709 | 2/1976 | Mathlies et al. | 60/547 |

FOREIGN PATENT DOCUMENTS

| | | | |
|---|---|---|---|
| 424,911 | 3/1935 | United Kingdom | 188/106 P |
| 559,921 | 3/1944 | United Kingdom | 188/357 |

*Primary Examiner*—George E. A. Halvosa

[57] ABSTRACT

A vehicle brake having a vacuum suspended operating section. The assembly is arranged so that initial braking is accomplished by the operator admitting atmospheric pressure to the pressure side of a diaphragm that has a vacuum on its opposing side. The assembly is further arranged so that the wheel cylinder can be used to convert hydraulic pressure to air pressure. When the vehicle operator first applies a force to the brake pedal, a valve is actuated which allows vacuum and atmospheric pressure to impart sufficient force to provide initial braking. When greater brake pressures are required as indicated by increased brake pedal force exerted by the vehicle operator, a valve leading to atmospheric pressure closes, allowing the hydraulic pressure in the wheel cylinder to convert the trapped atmospheric pressure to air pressure. As this pressure is inner connected to the large diaphragm area, sufficient force is exerted on the brake lining to provide the required brake torque, without any increase in the pressure supplied to the wheel cylinder above that supplied to the master cylinder by the vehicle operator.

2 Claims, 1 Drawing Figure

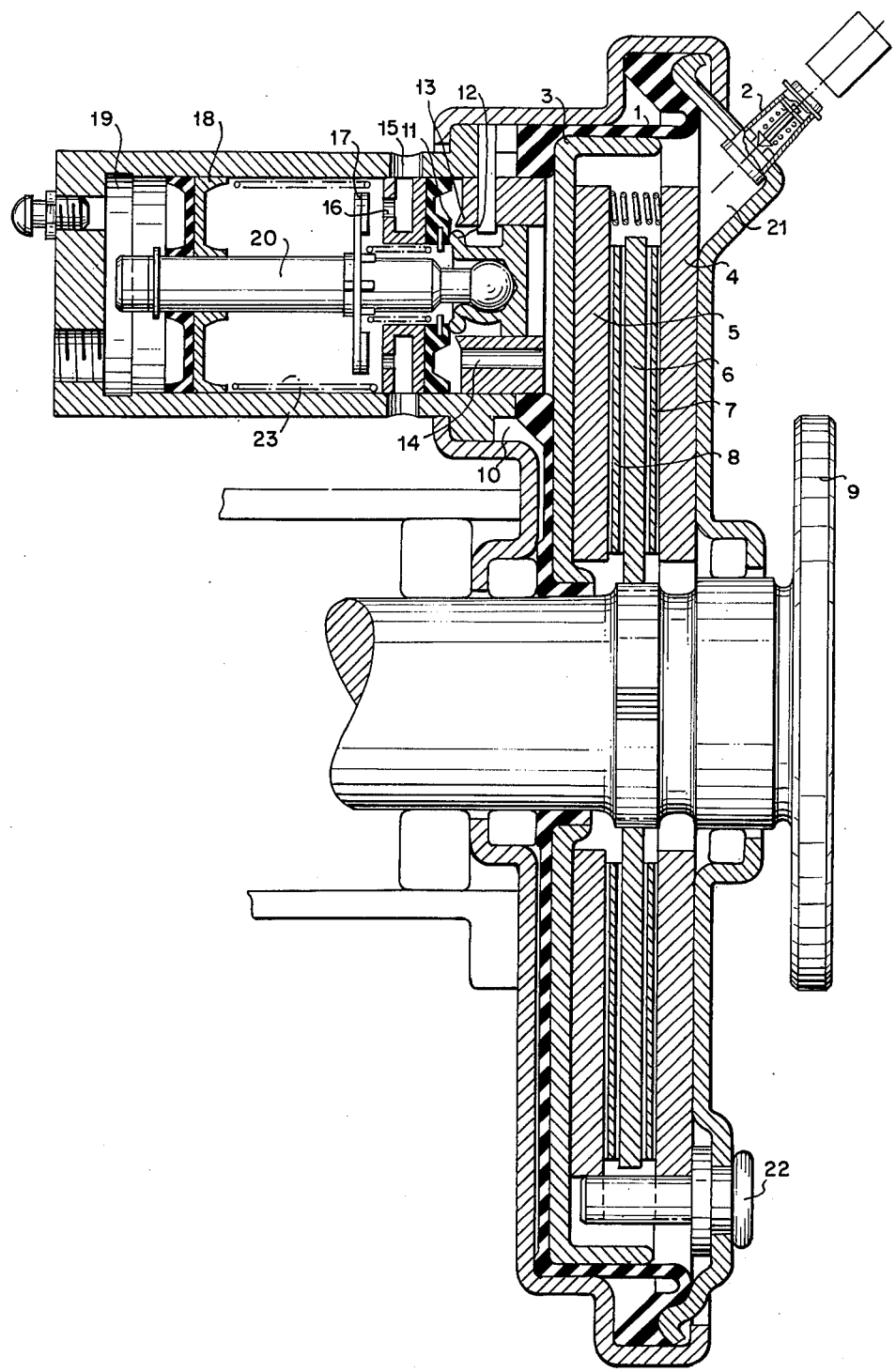

VACUUM SUSPENDED DISC BRAKE

This invention relates to brakes. More specifically, this invention is directed to an improved disc brake whereby full braking torque can be developed without resorting to high unit pressures. Disc brakes have been developed which are used in conjunction with power units. These power units act to produce high unit pressure and transmit it to the disc brake to produce sufficient force between rotor and stationary lining to insure the required torque.

The present invention provides for combining into a single unit the best operating features of the disc brake with the power producing vacuum unit. Accordingly, it is an object of this present invention to provide a disc brake that will produce equivalent braking without resorting to high unit pressures.

Another object of this invention is to make use of atmospheric pressure on a large area to provide a force large eneough to produce braking.

A further object of this invention is to use a piston in a cylinder to raise the unit pressure against the large area well above atmospheric pressure.

Other and more detailed objects and advantages will appear hereinafter. The drawing is a sectional view of a brake illustrating a preferred embodiment of this invention.

Referring to the drawing, a cross section of a single rotor brake, other rotors may be associated in the same brake without varying from the inventive concept.

A diaphragm 1 is provided in such a way as to isolate from atmospheric pressure a chamber which is in communication with a source of vacuum through intake valve 2. suspended in this chamber is a pressure plate 3, torque plates 4 and 5, and rotor 6, which is attached to linings 7 and 8. Shaft 9 is the braked shaft. On the opposing side of diaphragm 1 in chamber 10 are located valve 11 and valve seat 12, a second valve seat 13 provides a closure for valve 11 when valve seat 12 is displaced by pushrod 20. Passage 14 is in communication with chamber 21 and acts with valve 11 and valve seat 13 to hold vacuum chamber 21. Valve 11 and valve seat 12, when open, permit atmospheric pressure to act on diaphragm 1, upsetting the balance of pressure between the two chambers. Port 15 is provided to by-pass atmospheric pressure around valve seat 16 and valve 17. Valve 17 is provided to close off port 15 when additional pressure is needed. Piston 18 is provided to supply it.

To produce torque, hydraulic fluid under pressure is admitted to cylinder 19, moving pushrod 20 to close off valve 11 by seating it on valve seat 13, and moving valve seat 12 away from valve 11 and exposing pressure side of diaphragm 1 to atmospheric pressure. Diaphragm 1 being pulled by vacuum in chamber 21 applies a force through plate 3 and torque plate 5 to rotating lining 7, 8 and rotor 6. Torque plate 4 being backed up by shell of chamber 21 and being anchored along with torque plate 5 by anchor pin 22 a torque is produced at lining faces.

To increase torque, hydraulic pressure in cylinder 19 is increased, moving valve 17 to close off port 15, moving piston 18 to compress the air in cylinder 19, thereby increasing the pressure against diaphragm 1 and increasing the force on lining 7 and 8. spring 23 acts to return piston 18 to starting point. Tandam diaphragms could be used in this brake to increase force on linings.

What is claimed:

1. A disc brake and actuator assembly comprising:

a housing;

diaphragm means separating said housing into two chambers;

rotor and stator disc means supported in one chamber of the housing;

means for producing a differential pressure in said housing including a vacuum and pressure source, said vacuum acting in said one chamber to move the rotor and stator disc means into braking engagement and said pressure source, including atmospheric air received through an intake port, acting in the other of said chambers;

a double acting valve movable for selectively connecting said chambers either together or the second chamber with the inlet port;

fluid actuated piston means acting in a cylinder and connected to said valve to provide said movement;

whereby, in one valve position, the vacuum acts on both said chambers while communication to said inlet port is closed, in a second valve position the vacuum acts on said one chamber while said other chamber communicates with the atmosphere through the inlet port, and in a third valve position the vacuum acts on said one chamber, the inlet port is closed and the atmospheric air trapped in the cylinder between the piston and other chamber is compressed for additional force on the diaphragm area in said other chamber.

2. The assembly of claim 1 wherein springs for separating the disc means and anchors for locating the disc means are received in said one chamber.

* * * * *